United States Patent
Weitzel et al.

(10) Patent No.: US 7,388,047 B2
(45) Date of Patent: Jun. 17, 2008

(54) REDISPERSIBLE POWDERS COMPRISING POZZOLANIC COMPONENTS

(75) Inventors: Hans-Peter Weitzel, Reischach (DE); Hermann Lutz, Emmerting (DE); Peter Fritze, Haiming (DE); Stefan Killat, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 502 days.

(21) Appl. No.: 10/873,874

(22) Filed: Jun. 22, 2004

(65) Prior Publication Data
US 2005/0014881 A1    Jan. 20, 2005

(30) Foreign Application Priority Data
Jul. 17, 2003    (DE) ............... 103 32 526

(51) Int. Cl.
*C08K 3/34* (2006.01)
(52) U.S. Cl. .............. 524/442; 524/443; 524/444; 524/445; 524/447; 524/448
(58) Field of Classification Search ............. 524/442, 524/443, 444, 445, 447, 448
See application file for complete search history.

(56) References Cited

U.S. PATENT DOCUMENTS 5,118,751 A * 6/1992 Schulze et al. ............ 524/503
6,548,589 B2   4/2003 Widmer et al.
2002/0035174 A1   3/2002 Garrett et al.
2006/0111478 A1 * 5/2006 Hommer et al. ............ 524/5

FOREIGN PATENT DOCUMENTS

CN    1326468    6/2004
SU    430111    5/1974

OTHER PUBLICATIONS

Fox T. G., Bull. Am. Physics Soc. 1, 3, p. 123 (1956).
Polymer Handbook, 2nd Edition, J. Wiley & Sons, New York (1975).
English Derwent Abstract Corresponding to CN 1326468 [AN 2000-388605], 2000.
Derwent Abstract corresponding to SU 430 111, 1974.

* cited by examiner

Primary Examiner—Edward J. Cain
(74) Attorney, Agent, or Firm—Brooks Kushman P.C.

(57) ABSTRACT

Water-redispersible polymer powder compositions based on homopolymers or copolymers of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides, one or more protective colloids, if desired antiblocking agents, contain one or more compounds from the group of pozzolanas. The pozzolanic compounds preferably take the place of anti-blocking agents conventionally used.

10 Claims, No Drawings

REDISPERSIBLE POWDERS COMPRISING POZZOLANIC COMPONENTS

BACKGROUND OF THE INVENTION

1. Field of the Invention

The invention relates to water-redispersible polymer powder compositions comprising one or more components having pozzolanic properties, a process for producing them, and TO their use.

2. Background Art

Polymers based on vinyl esters, vinyl chloride, (meth) acrylate monomers, styrene, butadiene and ethylene are predominantly used in the form of their water-redispersible polymer powders in a variety of applications, for example as coating compositions, or as adhesives for a variety of substrates. These products are used, in particular, as binders in hydraulically setting adhesives, e.g. in thermal insulation composite system "TICS" mortars, and in tile adhesives based on cements or plaster of Paris. Important properties of hydraulically setting mortar compositions include maintaining processability over time, and mechanical strength after curing. The addition of redispersion powders has a threefold action: it increases the water retention capacity of the mortar; it reduces evaporation by film formation; and, as an additional binder, increases the mechanical strength of the cured mortar.

SUMMARY OF THE INVENTION

It is an object of the invention to develop water-redispersible polymer powder compositions whose addition can further increase the mechanical strength of cured mortar. This and other objects have surprisingly been achieved by addition of additives having pozzolanic properties, i.e. by addition of pozzolanas.

DETAILED DESCRIPTION OF THE PREFERRED EMBODIMENT(S)

The invention provides water-redispersible polymer powder compositions based on homopolymers or copolymers of one or more "principle" monomers from the group consisting of vinyl esters of unbranched or branched alkylcarboxylic acids having from 1 to 15 carbon atoms, methacrylic and acrylic ("(meth)acrylic") esters of alcohols having from 1 to 15 carbon atoms, vinylaromatics, olefins, dienes and vinyl halides, one or more protective colloids, and optionally, antiblocking agents, wherein one or more pozzolanas are present.

Additives having pozzolanic properties (pozzolanas) are silica-containing or silica and alumina-containing natural or synthetic materials which are not themselves able to act as binders but together with water and lime form water-insoluble compounds having cement-like properties. See, e.g., BIM-Lexikon in www.b-i-m.de. A distinction is made between natural and synthetic pozzolanas. Natural pozzolanas include glass-rich ashes and rocks of volcanic origin, for example pumice, trass (finely milled tuff), Santorin earth, kieselguhr, hornstones (silica rocks), chert and moler earth. Synthetic pozzolanas include fired, ground clay (ground brick), fly ashes such as ash from a coal-fired power station, silica dust, oil shale ash (oil shale=bituminous, lime-containing shale), and calcined kaolin (metakaolin).

The synthetic pozzolanas are preferably selected from the group consisting of ground brick, fly ash, silica dust, oil shale ash, and metakaolin, with greatest preference given to metakaolin. The amount used is from 5 to 50% by weight, preferably from 10 to 30% by weight, based on the total weight of the water-redispersible polymer powder composition.

Vinyl esters suitable for the base polymer are those of carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 13 carbon atoms, for example VeoVa9® or VeoVa10® (trade names of Resolution Products). Particular preference is given to vinyl acetate.

Suitable (meth)acrylic esters are esters of unbranched or branched alcohols having from 1 to 15 carbon atoms, e.g. methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A suitable vinyl halide is vinyl chloride.

If desired, from 0.05 to 50% by weight, preferably from 1 to 10% by weight, based on the total weight of the base polymer, of auxiliary monomers can be copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids and salts thereof, preferably vinylsulfonic acid, and 2-acrylamido-2-methylpropanesulfonic acid. Further examples are precrosslinking comonomers such as multiply ethylenically unsaturated comonomers, for example divinyl adipitate, diallyl maleate, allyl methacrylate or triallyl cyanurate, and also postcrosslinking comonomers, for example acrylamidoglycolic acid (AGA), methyl methylacrylamidoglycolate (MMAG), N-methylolacrylamide (NMA), N-methylolmethacrylamide (NMMA), allyl N-methylolcarbamate, alkyl ethers such as the isobutoxy ether, or alkyl esters of N-methylolacrylamide, of N-methylolmethacrylamide and of allyl N-methylolcarbamate. Also suitable are epoxy-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, where the alkoxy groups present may be, for example, methoxy, ethoxy and ethoxypropylene glycol ether radicals. Mention may also be made of monomers containing hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetylacetoxyethyl acrylate or methacrylate.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers selected from the group consisting of vinyl esters having from 1 to 12 carbon atoms in the carboxylic acid radical, e.g. vinyl propionate, vinyl laurate, vinyl esters of α-branched carboxylic acids having from 9 to 13 carbon atoms, e.g. VeoVa9®, VeoVa10®, VeoVa11®; copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an α-branched carboxylic acid having from 9 to 11 carbon atoms and also from 1 to 30% by weight of acrylic esters of unbranched or branched alcohols having from 1 to 15 carbon atoms, in particular n-butyl acrylate or 2-ethylhexyl acrylate, and additionally containing from 1 to 40% by weight of ethylene; copolymers comprising vinyl acetate, from 1 to 40% by weight of ethylene and from 1 to 60% by weight of vinyl chloride; where the auxiliary monomers mentioned may also be present in the polymers in the specified amounts and the percentages by weight in each case add up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate; styrene-acrylic ester copolymers comprising one or more monomers from the group consisting of methyl acrylate, ethyl acrylate, propyl acrylate, n-butyl acrylate, 2-ethylhexyl acrylate; vinyl acetate-acrylic ester copolymers comprising one or more monomers from the group consisting of methyl acrylate, ethyl acrylate, propyl acrylate, n-butyl acrylate, 2-ethylhexyl acrylate and, if desired, ethylene; styrene-1,3-butadiene copolymer; where the auxiliary monomers mentioned may also be present in the polymers in the specified amounts and the percentages by weight in each case add up to 100% by weight.

The monomers and the proportions by weight of the comonomers are chosen so that, in general, a glass transition temperature $T_g$ of from −50° C. to +50° C., preferably from −30° C. to +40° C., results. The glass transition temperature $T_g$ of the polymers can be determined in a known manner by means of differential scanning calorimetry (DSC). The $T_g$ can also be calculated approximately beforehand by means of the Fox equation. According to T. G. Fox, BULL. AM: PHYSICS SOC. 1, 3, page 123 (1956): $1/T_g = X1/T_g1 + X2/T_g2 + \ldots + xn/T_gn$, where xn is the mass fraction (% by weight/100) of the monomer n and $T_gn$ is the glass transition temperature in kelvin of the homopolymer of the monomer n. $T_g$ values for homopolymers are given in the Polymer Handbook 2nd Edition, J. Wiley & Sons, New York (1975).

The homopolymers and copolymers are prepared by the emulsion polymerization process or by the suspension polymerization process, preferably by the emulsion polymerization process, and the polymerization temperature is generally from 40° C. to 100° C., preferably from 60° C. to 90° C. The copolymerization of gaseous comonomers such as ethylene, 1,3-butadiene or vinyl chloride can also be carried out under superatmospheric pressure, in general at from 5 bar to 100 bar.

The polymerization is initiated by means of the water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide and azobisisobutyronitrile. Examples of monomer-soluble initiators are dicetyl peroxydicarbonate, dicyclohexyl peroxydicarbonate and dibenzoyl peroxide. The initiators mentioned are generally used in an amount of from 0.001 to 0.02% by weight, preferably from 0.001 to 0.01% by weight, in each case based on the total weight of the monomers.

As redox initiators, use is made of combinations of the abovementioned initiators with reducing agents. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.001 to 0.03% by weight, preferably from 0.001 to 0.015% by weight, in each case based on the total weight of the monomers.

To control the molecular weight, regulating substances (chain transfer agents) can be used during the polymerization. If regulators are used, they are usually employed in amounts of from 0.01 to 5.0% by weight, based on the monomers to be polymerized, and are metered in separately or after premixing with reaction components. Examples of such substances are n-dodecyl mercaptan, tert-dodecyl mercaptan, mercaptopropionic acid, methyl mercaptopropionate, isopropanol and acetaldehyde.

Suitable protective colloids are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, and styrene-maleic acid and vinyl ether-maleic acid copolymers.

Preference is given to partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015). Preference is also given to partially hydrolyzed, hydrophobically modified polyvinyl alcohols having a degree of hydrolysis of from 80 to 95 mol % and a Höppler viscosity in 4% strength aqueous solution of from 1 to 30 mPas. Examples are partially hydrolyzed copolymers of vinyl acetate with hydrophobic comonomers such as isopropenyl acetate, vinyl pivalate, vinyl ethylhexanoate, vinyl esters of saturated α-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols mentioned.

Most preferred are polyvinyl alcohols having a degree of hydrolysis of from 85 to 94 mol % and a Höppler viscosity in 4% strength aqueous solution of from 3 to 15 mPas (Höppler method at 20° C., DIN 53015). The protective colloids mentioned are obtainable by methods known to those skilled in the art and are generally added in a total amount of from 1 to 20% by weight, based on the total weight of the monomers, in the polymerization.

If the polymerization is carried out in the presence of emulsifiers, they are present in an amount of from 1 to 5% by weight, based on the amount of monomers. Suitable emulsifiers include anionic, cationic and nonionic emulsifiers, for example anionic surfactants such as alkyl sulfates having a chain length of from 8 to 18 carbon atoms, alkyl or alkyl aryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkyl aryl polyglycol ethers having from 8 to 40 ethylene oxide units.

After conclusion of the polymerization, an after-polymerization can be carried out using known methods to remove residual monomer, in general by means of after-polymerization initiated by a redox catalyst. Volatile residual monomers can also be removed by means of distillation, preferably under reduced pressure and if desired while passing inert entrainer gases such as air, nitrogen or steam through or over the polymerization mixture. The aqueous dispersions obtainable in this way have a solids content of from 30 to 75% by weight, preferably from 50 to 60% by weight.

To prepare the water-redispersible polymer powders, the aqueous dispersions are dried, if appropriate after addition of protective colloids as atomization aids, for example by means of fluidized-bed drying, freeze drying or spray drying. The dispersions are preferably spray dried. Spray drying is carried out in customary spray drying plants, with atomization being able to be carried out by means of single-fluid, two-fluid or multifluid nozzles or a rotary disc atomizer. The exit temperature is generally set in the range from 45° C. to 120° C., preferably from 60° C. to 90° C., depending on the plant, the $T_g$ of the resin and the desired degree of drying.

An atomization aid (protective colloid) is generally used in a total amount of from 3 to 30% by weight, based on the polymeric constituents of the dispersion. This means that the total amount of protective colloid prior to the drying operation should be from 3 to 30% by weight, based on the polymer component(s); preference is given to using from 5 to 20% by weight, based on the polymer component(s). Suitable atomization aids are partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, styrene-maleic acid and vinyl ether-maleic acid copolymers. Preference is given to using no protective colloids other than polyvinyl alcohols as atomization aid, with the polyvinyl alcohols preferred as protective colloids also preferably being used as atomization aid.

A content of up to 1.5% by weight of antifoam, based on the base polymer, has frequently been found to be advantageous during atomization. To increase the shelf life by improving the blocking stability, particularly in the case of powders having a low glass transition temperature, the powder obtained can additionally be mixed with a conventional antiblocking agent (anticaking agent), preferably in an amount of from 5 to 20% by weight, based on the total weight of polymeric constituents. Examples of conventional antiblocking agents are calcium carbonate or magnesium carbonate, talc, gypsum, silica, kaolins, silicates, having particle sizes of preferably from 10 nm to 10 μm.

The viscosity of the feed to be atomized is adjusted via the solids content so that a value of <1000 mPas (Brookfield viscosity at 20 revolutions and 23° C.), preferably <250 mPas, is obtained. The solids content of the dispersion to be atomized is >35%, preferably >40%.

To improve the use properties, further additives can be added during the atomization. Further constituents of dispersion powder compositions in preferred embodiments are, for example, pigments, fillers, foam stabilizers, hydrophobicizing agents.

To produce the polymer powder composition, the pozzolana is added before, during or after drying. If it is added before drying, the pozzolana can be mixed into the appropriate polymer dispersion and the resulting mixture is subsequently dried. Preference is given to adding the pozzolana to the polymer powder during and after drying. The preferred addition during drying can be carried out by dispersing the pozzolana in the drying air or in the drying chamber simultaneously with the atomization of the feed (polymer dispersion). In a particularly preferred embodiment, no antiblocking agents in addition to the pozzolana are used.

The water-redispersible polymer powder compositions can be used in the application areas typical for such compositions for example in building chemical products, if appropriate in combination with hydraulically setting binders, such as cements (portland, alumina, trass, slag, magnesia or phosphate cement), plaster of Paris and water glass, for the production of building adhesives, in particular tile adhesives and full thermal insulation adhesives, plasters and renders, knifing fillers, flooring screeds, self-leveling compositions, sealing slurries, jointing mortars and paints. Preferred application areas are tile adhesives and full thermal insulation adhesives (FTI adhesives).

EXAMPLES

Dispersion D1:

The dispersion used was a dispersion of a copolymer of vinyl acetate and ethylene which was stabilized by means of polyvinyl alcohol. It was prepared by emulsion polymerization methods known to those skilled in the art. 10% by weight of a polyvinyl alcohol having a degree of hydrolysis of 88 mol % and a Höppler viscosity of 4 mPas was used for stabilization. The copolymer composition was 92% by weight of vinyl acetate and 8% by weight of ethylene.

Dispersion D2:

The dispersion used was a dispersion of a copolymer of vinyl acetate and ethylene which was stabilized by means of polyvinyl alcohol. It was prepared by emulsion polymerization methods known to those skilled in the art. 10% by weight of a polyvinyl alcohol having a degree of hydrolysis of 88 mol % and a Höppler viscosity of 4 mPas was used for stabilization. The copolymer composition was 88% by weight of vinyl acetate and 12% by weight of ethylene.

Powders:

The powders were produced by spray drying the above-mentioned dispersions with addition of 5% by weight of a polyvinyl alcohol having a degree of hydrolysis of 88 mol % and a Höppler viscosity of 4 mPas and 2% by weight of a polyvinyl alcohol having a degree of hydrolysis of 88 mol % and a Höppler viscosity of 13 mPas.

The dispersion was then sprayed by means of a two-fluid nozzle. The atomization gas employed was 4 bar of compressed air, and the droplets formed were dried in cocurrent by means of air heated to 125° C. The dry powder obtained was admixed with 10% by weight or 20% by weight of metakaolin. For comparison, powders to which a commercial antiblocking agent (calcium magnesium carbonate) instead of metakaolin had been added in the same amounts were produced.

Testing:

The powders obtained were tested to determine the powder properties and their effectiveness in mineral tile adhesives.

Powder Flow PF:

The powder flow was assessed only visually via the formation of the cone of poured powder.

Determination of the Blocking Resistance BR:

To determine the blocking resistance, the dispersion powder was introduced into an iron tube having a screw cap and then loaded by means of a metal ram. The tube was stored under load at 50° C. for 16 hours. After cooling to room temperature, the powder was removed from the tube and the blocking resistance was determined qualitatively by crushing the powder. The blocking resistance was classified as follows:

1-3=very good blocking resistance
4-6=good blocking resistance
7-8=satisfactory blocking resistance
9-10=not resistant to blocking, powder cannot be crushed or is no longer free-flowing after crushing.

Determination of the Sedimentation Behavior SB:

The sedimentation behavior of the redispersion serves as a measure of the redispersibility of the powder. Redispersions having a solids content of 50% in water were produced by action of strong shear forces.

The sedimentation behavior was then determined on diluted redispersions (solids content=0.5%), for which purpose 100 ml of this dispersion were introduced into a graduated tube and the height of sedimented solid was measured. The sedimentation behavior is reported in mm of sediment after 24 hours. Values of greater than 7 indicate unsatisfactory redispersion of the powder.

The results of the tests for powder flow PF, blocking resistance BR and sedimentation behavior SB of the redispersion powders are summarized in table 1.

They show that addition of the pozzolanas gives redispersion powders whose powder properties are superior to those of powders modified with antiblocking agents. The pozzolanas thus give free-flowing, noncaking powders, without the disadvantage of powders modified with antiblocking agents, i.e. their inert character.

TABLE 1

| Example | Dispersion | Additive | Amount in % by wt. | PF | BR | SB |
|---|---|---|---|---|---|---|
| C1 | D1 | Ca—Mg—CO₃ | 20 | good | 3.5 | 2.6 |
| 2 | D1 | Metakaolin | 10 | good | 3.0 | 2.4 |
| 3 | D1 | Metakaolin | 20 | good | 1.5 | 3.0 |
| C4 | D2 | Ca—Mg—CO₃ | 20 | good | 3.5 | 2.3 |

TABLE 1-continued

| Example | Dispersion | Additive | Amount in % by wt. | PF | BR | SB |
|---|---|---|---|---|---|---|
| 5 | D2 | Metakaolin | 10 | good | 3.0 | 2.6 |
| 6 | D2 | Metakaolin | 20 | good | 2.5 | 2.1 |

Determination of the adhesive pull strength of a cement-containing tile adhesive modified with the redispersion powders:

The adhesive pull strengths in the tile adhesive were tested using the following formulation (polymer content 3%):

| | |
|---|---|
| Silica sand | 565 parts |
| Portland cement | 400 parts |
| Cellulose | 5 parts |
| Redispersion powder | 30 parts |

The adhesive pull strengths were determined after 3 storage conditions:

| | |
|---|---|
| 28D: | Dry storage for 28 days |
| 7D/21W: | 7 days dry/21 days wet (wet storage) |
| 14D/14D at +70° C./1D: | Hot storage |
| F/T: | Freezing/thawing cycle |

The results of this test are summarized in Table 2.

They show the positive effect of the pozzolanas, in particular on the adhesive pull strength after storage in water.

TABLE 2

| Example | 28D N/mm² | 7D/21W N/mm² | 14D/14D at +70/1D N/mm² | F/T N/mm² |
|---|---|---|---|---|
| C1 | 1.90 | 0.96 | 1.36 | 1.15 |
| 2 | 1.85 | 1.11 | 1.41 | 1.19 |
| 3 | 1.91 | 1.17 | 1.61 | 1.28 |
| C4 | 1.80 | 0.99 | 1.33 | 1.14 |
| 5 | 1.84 | 1.14 | 1.37 | 1.18 |
| 6 | 2.09 | 1.27 | 1.32 | 1.25 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water-redispersible polymer powder composition comprising at least one homopolymer or copolymer of at least one monomer selected from the group consisting of vinyl esters of optionally or branched alkylcarboxylic acids having from 1 to 15 carbon atoms, (meth)acrylic esters of alcohols having from 1 to 15 carbon atoms, vinylaromatics, olefins, dienes and vinyl halides; one or more protective colloids, optionally one or more antiblocking agents; and at least one pozzolana compound selected from the group consisting of pumice, trass, Santorin earth, hornstones, chert, moler earth, ground brick, fly ash, oil shale ash and calcined kaolin.

2. The water-redispersible polymer powder composition of claim 1, wherein pozzolana(s) are present in an amount of from 10 -30% by weight relative to the total weight of the polymer powder composition.

3. A water-redispersible polymer powder composition comprising at least one homopolymer or copolymer of at least one monomer selected from the group consisting of vinyl esters of optionally or branched alkylcarboxylic acids having from 1 to 15 carbon atoms, acrylic esters of alcohols having from 1 to 15 carbon atoms, vinylaromatics, olefins, dienes and vinyl halides; one or more protective colloids, optionally one or more antiblocking agents; and at least one pozzolana compound, wherein metakaolin is present as a pozzolana.

4. The water-redispersible polymer powder composition as claimed in claim 1, wherein said homopolymers or copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, or styrene-1,3-butadiene copolymers.

5. The water-redispersible polymer powder composition of claim 1, wherein at least one protective colloids is a partially hydrolyzed or fully hydrolyzed, optionally hydrophobically modified, polyvinyl alcohol having a degree of hydrolysis of from 80 to 100 mol % and a Höppler viscosity in 4% strength aqueous solution of from 1 to 30 mPas (Höppler method at 20° C., DIN 53015).

6. The water-redispersible polymer powder composition of claim 1, wherein the pozzolana is present in an amount of from 5 to 50% by weight, based on the total weight of the powder composition.

7. A process for producing a water-redispersible polymer powder composition comprising a water-redispersible polymer powder composition comprising at least one homopolymer or copolymer of at least one monomer selected from the group consisting of vinyl esters of optionally or branched alkylcarboxylic acids having from 1 to 15 carbon atoms, (meth)acrylic esters of alcohols having from 1 to 15 carbon atoms, vinylaromatics, olefins, dienes and vinyl halides; one or more protective colloids, optionally one or more antiblocking agents; and at least one pozzolana compound, which comprises adding at least one pozzolana compound to a dispersion of the homopolymer or copolymer before drying, atomizing at least one pozzolana compound together with the polymer dispersion during drying, or adding at least one pozzolana compound to the polymer powder after drying.

8. The process of claim 7, wherein said pozzolana serves as an antiblocking agent, and no further antiblocking agent is added to the water-redispersible polymer powder composition.

9. In a chemical building product, comprising a hydraulically setting binder and a redispersible polymer powder, the improvement comprising including as said redispersible polymer powder, the redispersible polymer powder of claim 1.

10. The building product of claim 9, selected from the group consisting of building adhesives, tile adhesives, full thermal insulation adhesives, plasters, renders, knifing fillers, flooring screeds, self-leveling compositions, sealing slurries, jointing mortars, and paints.

* * * * *